United States Patent
Kashio et al.

(10) Patent No.: US 9,249,509 B2
(45) Date of Patent: Feb. 2, 2016

(54) METHOD FOR REGENERATING SOLUTION FOR NITRIC ACID ACTIVATION TREATMENT OF ZINC-PLATED METAL MEMBER SURFACE, AND REGENERATION TREATMENT APPARATUS USING THE SAME

(71) Applicant: DIPSOL CHEMICALS CO., LTD., Tokyo (JP)

(72) Inventors: Ryuta Kashio, Funabashi (JP); Tomitaka Yamamoto, Tokyo (JP)

(73) Assignee: DIPSOL CHEMICALS CO., LTD., Tokyo (JP)

( * ) Notice: Subject to any disclaimer, the term of this patent is extended or adjusted under 35 U.S.C. 154(b) by 0 days.

(21) Appl. No.: 14/399,486

(22) PCT Filed: May 10, 2013

(86) PCT No.: PCT/JP2013/063166
§ 371 (c)(1),
(2) Date: Nov. 6, 2014

(87) PCT Pub. No.: WO2013/168799
PCT Pub. Date: Nov. 14, 2013

(65) Prior Publication Data
US 2015/0096461 A1    Apr. 9, 2015

(30) Foreign Application Priority Data
May 10, 2012    (JP) .................. 2012-108653

(51) Int. Cl.
*C23C 18/31* (2006.01)
*C02F 1/54* (2006.01)
(Continued)

(52) U.S. Cl.
CPC .............. *C23C 18/1617* (2013.01); *C02F 1/54* (2013.01); *C23C 18/1628* (2013.01);
(Continued)

(58) Field of Classification Search
CPC   C23C 18/1617; C23C 18/1689; C23C 18/31; C23C 2222/10; C23C 22/86; C25D 21/16; C25D 21/18; C02F 1/5272; C02F 1/5236; C02F 1/54; C02F 1/62; C02F 1/66; C02F 2101/20; C02F 2103/16; C02F 2209/06

USPC ............ 106/1.29; 205/99; 422/110; 210/729, 210/743, 167.01, 195.1
See application file for complete search history.

(56) References Cited

U.S. PATENT DOCUMENTS 6,719,852 B2 *   4/2004   Oshima .................. C23C 22/46
                                                           148/243
6,858,098 B2 *   2/2005   Oshima .................. C23C 22/46
                                                           148/265
(Continued)

FOREIGN PATENT DOCUMENTS

JP       55-161074 A     12/1980
JP       2006-316330 A   11/2006
WO       WO 2009/129271 A1 * 10/2009

OTHER PUBLICATIONS

English translation of JP 2006/316330; Nov. 2006; 9 pages.*

(Continued)

*Primary Examiner* — Helene Klemanski
(74) *Attorney, Agent, or Firm* — Hoffmann & Baron, LLP (57) ABSTRACT

Provided is a method for regenerating a nitric acid active treatment solution comprising: adding a zinc ion-aggregating agent to a nitric acid active treatment solution for a surface of a zinc-based material plated metal member, the nitric acid active treatment solution containing zinc ions, to thereby aggregate the zinc ions in the solution as an insoluble salt; and separating and removing the insoluble salt. This regeneration method is employed instead of methods conventionally and widely conducted in zinc-based plating on a steel material such as the exchange of the entire amount of the nitric acid active treatment solution after a lapse of a certain time, and is a method for regenerating a nitric acid active treatment solution, comprising: depositing and removing zinc ions which come to be mixed in the nitric acid active treatment solution during a zinc-based plating process on a steel material, so that the quality of a trivalent chromium chemical conversion treatment can be controlled at a constant level through simplification and cost reduction of a plating control step, and the waste nitric acid can be reduced as much as possible.

12 Claims, 3 Drawing Sheets

(51) Int. Cl.
- *C02F 1/62* (2006.01)
- *C02F 1/66* (2006.01)
- *C23C 18/16* (2006.01)
- *C23C 22/78* (2006.01)
- *C23C 22/86* (2006.01)
- *C25D 21/16* (2006.01)
- *C02F 103/16* (2006.01)

(52) U.S. Cl.
CPC ........ *C23C 18/1646* (2013.01); *C23C 18/1689* (2013.01); *C23C 18/31* (2013.01); *C23C 22/78* (2013.01); *C23C 22/86* (2013.01); *C25D 21/16* (2013.01); *C02F 2103/16* (2013.01); *C02F 2209/06* (2013.01); *C23C 2222/10* (2013.01)

(56) References Cited

U.S. PATENT DOCUMENTS

| | | | |
|---|---|---|---|
| 8,337,641 B2* | 12/2012 | Yamamoto | C23C 22/17 148/22 |
| 2007/0023104 A1* | 2/2007 | Yamamoto | C23C 22/17 148/266 |
| 2014/0017514 A1* | 1/2014 | Inoue | C23C 22/17 428/656 |

OTHER PUBLICATIONS

International Search Report for PCT/JP2013/063166, mailed Aug. 20, 2013 (in English and Japanese).

Written Opinion for PCT/JP2013/063166, dated Aug. 20, 2013 (in Japanese).

* cited by examiner

At start of treatment

FIG.2-2

22 hours after start of treatment

FIG.2-3

METHOD FOR REGENERATING SOLUTION FOR NITRIC ACID ACTIVATION TREATMENT OF ZINC-PLATED METAL MEMBER SURFACE, AND REGENERATION TREATMENT APPARATUS USING THE SAME

CROSS-REFERENCE TO RELATED APPLICATIONS

This application is the National Stage of International Application No. PCT/JP2013/063166, filed May 10, 2013, which claims the benefit of Japanese Application No. 2012-108653, filed May 10, 2012, the entire contents of all of which are incorporated by reference herein.

FIELD OF THE INVENTION

The present invention relates to a method in which zinc ions which come to be mixed in a nitric acid solution for activation of a plated substrate surface in a zinc plating and trivalent chromium chemical conversion treatment on a steel material are efficiently removed, so that the nitric acid active treatment solution is regenerated and recycled, as well as a apparatus for the regeneration treatment.

BACKGROUND OF THE INVENTION

Conventionally, plating on steel materials has been widely employed, because of their susceptibility to corrosion. Zinc plating has been widely employed as plating on steel materials. To further improve the surface characteristics, the surface is activated by immersion in a nitric acid solution after the zinc plating is conducted, and then a trivalent chromium chemical conversion treatment is conducted. In this case, the steps from the zinc plating to the trivalent chromium chemical conversion treatment are often conducted continuously, and the trivalent chromium chemical conversion treatment, which is the subsequent step, may be adversely affected depending on the state of the activation treatment liquid.

The activation effects of the activation nitric acid solution are lost, because gradual accumulation of zinc ions is caused by dissolution of the zinc plating from the substrate surface due to the activation and the drag-in of the plating liquid from the zinc plating step due to attachment of the plating liquid to the product. At the time point where the accumulation of the zinc concentration in the activation nitric acid solution causes the loss of the gloss on the substrate surface after the activation treatment, the entire amount of the nitric acid solution has to be exchanged, which requires labors and the expenditure for purchasing nitric acid.

To overcome such an adverse effect, a control method and an apparatus are known in which zinc ions dissolved in an activation nitric acid solution are removed by ion exchange with hydrogen ions (Patent Document 1). However, this method requires labors for maintaining the function of the ion-exchange resin, and still has a problem in terms of economy, and hence there remains a room for improvement.

CITATION LIST

Patent Literature

Patent Literature 1: JP 2006-316330A

SUMMARY OF THE INVENTION

An object of the present invention is to provide a method for regenerating a nitric acid active treatment solution, comprising: depositing and removing zinc ions which come to be mixed in the nitric acid active treatment solution during a zinc-based plating process on a steel material, so that the quality of a trivalent chromium chemical conversion treatment can be controlled at a constant level through simplification and cost reduction of a plating control step, and the waste nitric acid can be reduced as much as possible. This method is employed instead of methods conventionally and widely conducted in zinc-based plating on a steel material such as the exchange of the entire amount of the nitric acid active treatment solution after a lapse of a certain time.

Another object of the present invention is to provide a regeneration treatment apparatus for a nitric acid active treatment solution for a surface of a zinc-based material plated metal member, in which the regeneration method can be carried out efficiently.

Figure 1:
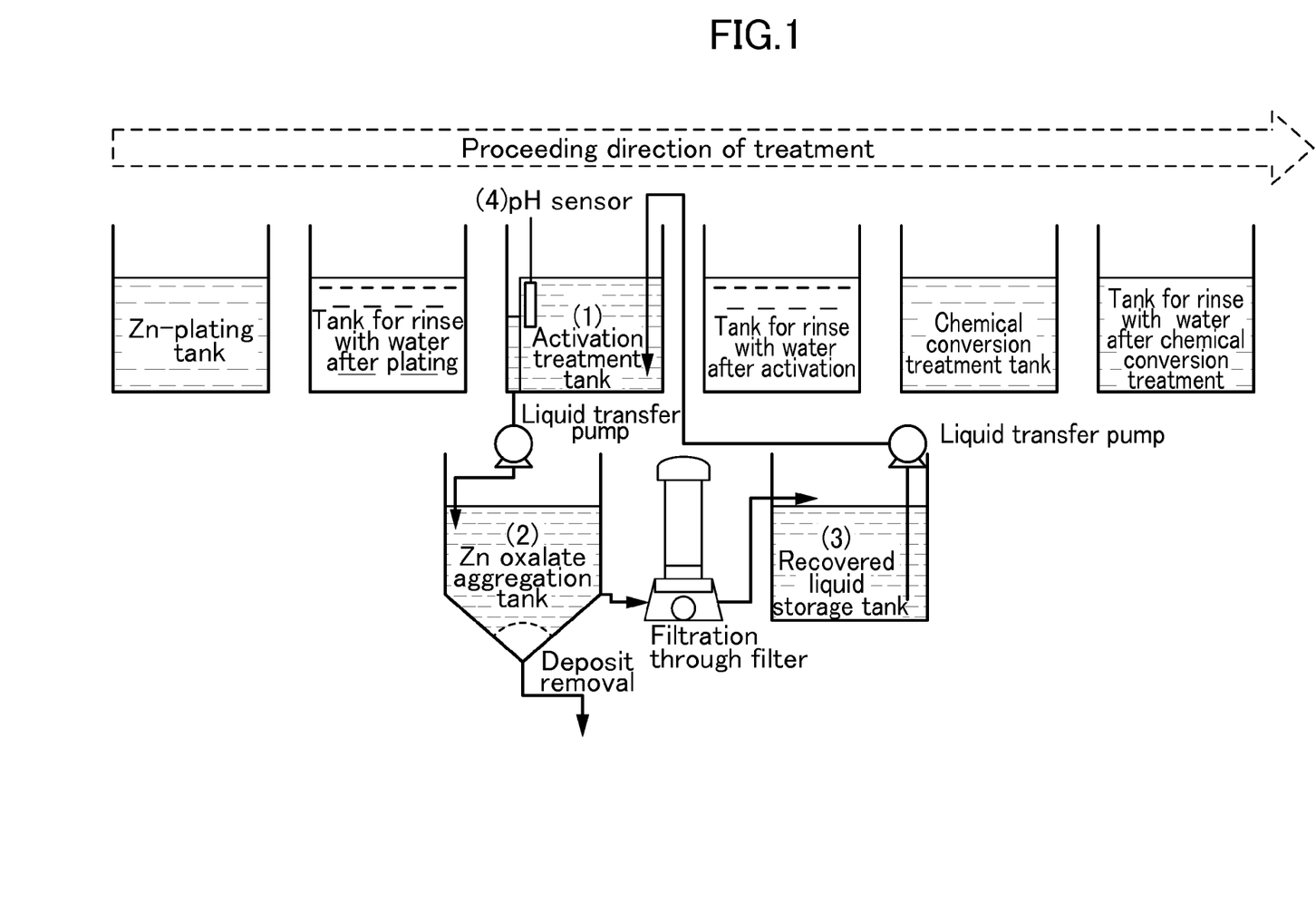
FIG. 1 shows an outline of a regeneration treatment apparatus of the present invention.

The present invention has been made based on the following findings. Specifically, the above-described object can be efficiently achieved when zinc ions in a zinc ion-containing nitric acid active treatment solution are separated and removed as an insoluble salt after zinc ions contained in the nitric acid active treatment solution for a surface of a zinc-based material plated metal member are aggregated with a zinc ion-aggregating agent. Also, the above-described object can be efficiently achieved by the use of a regeneration treatment apparatus comprising a nitric acid activation treatment tank (1), an aggregation tank (2), a filter apparatus (4), and a recovered-liquid storage tank (3), which are provided consecutively in this order through piping to form a circulating circuit, and further comprising a pH-controlling device (5) at a specific position.

Specifically, the present invention provides a method for regenerating a nitric acid active treatment solution, comprising: adding a zinc ion-aggregating agent to a nitric acid active treatment solution for a surface of a zinc-based material plated metal member, the nitric acid active treatment solution containing zinc ions, to thereby aggregate the zinc ions in the solution as an insoluble salt; and separating and removing the insoluble salt.

The present invention also provides a method for regenerating a nitric acid active treatment solution, comprising:

introducing zinc ions, which come to be mixed in a nitric acid activation treatment tank (1), in the form of a zinc ion-containing nitric acid active treatment solution into an aggregation tank (2);

adding a zinc ion-aggregating agent to the aggregation tank (2), mixing the zinc ion-aggregating agent with the zinc ion-containing nitric acid active treatment solution to thereby aggregate the zinc ions as an insoluble salt, and removing the insoluble salt;

transferring the obtained liquid from which the zinc ions are removed to a recovered liquid storage tank (3) and storing the liquid in the recovered liquid storage tank (3); then adjusting the pH of the nitric acid active treatment solution in the tank (3); and then returning the nitric acid active treatment solution to the nitric acid activation treatment tank (1).

The present invention also provides a regeneration treatment apparatus for a nitric acid active treatment solution for a surface of a zinc-based material plated metal member, comprising:

a nitric acid activation treatment tank (1) in which an active treatment is conducted on a surface of a zinc-based material plated metal member by using a nitric acid active treatment solution;

an aggregation tank (2) in which a zinc ion-aggregating agent is added to the nitric acid active treatment solution to thereby aggregate the zinc ions in the solution as an insoluble salt;

a filter apparatus (4) configured to separate and remove the aggregated insoluble zinc salt; and a recovered-liquid storage tank (3) in which a filtrate is temporarily stored, wherein the nitric acid activation treatment tank (1), the aggregation tank (2), the filter apparatus (4), and the recovered-liquid storage tank (3) are provided consecutively in this order through piping to for a circulating circuit; and at least one or more of the recovered-liquid storage tank (3), the nitric acid activation treatment tank (1), and the piping between the recovered-liquid storage tank (3) and the activation treatment tank (1) provided consecutively further have a pH-controlling device (5) configured to maintain the pH due to the nitric acid concentration of the nitric acid active treatment solution within a specific range.

The method and apparatus for regenerating a nitric acid active treatment solution according to the present invention make it possible to efficiently recover and remove zinc from a nitric acid active treatment solution in which zinc is accumulated, and reuse the nitric acid active treatment solution. In addition, the recovered zinc can be calcined to form zinc oxide, which contributes to the effective use of the resource.

BRIEF DESCRIPTION OF THE DRAWINGS

FIG. 2-1 shows an outline of a state at the start of a regeneration treatment of the present invention.

FIG. 2-2 shows an outline of a state 22 hours after the start of the regeneration treatment of the present invention.

FIG. 2-3 shows an outline of a state 24 hours after the start of the regeneration treatment of the present invention.

DESCRIPTION OF EMBODIMENTS

A nitric acid active treatment solution to which the present invention is applied is preferably a solution having a total nitric acid concentration of 0.5 to 80 g/L, a pH of 0.5 to 3.0, and a temperature of 0 to 50° C. A nitric acid active treatment solution satisfying these conditions is preferable particularly in that the gloss on a surface of a zinc-based material plated metal member can be maintained.

The nitric acid active treatment solution may contain impurities. The impurities here include metal ions such as iron and copper, as well as organic materials contained in a plating liquid.

A zinc ion-aggregating agent for aggregating and depositing zinc ions used in the present invention is not particularly limited, as long as it is an agent which is soluble in the nitric acid active treatment solution and has a function to aggregate the zinc ions in the treatment liquid by forming an insoluble or hardly soluble salt with the zinc ions. The zinc ion-aggregating agent is preferably oxalic acid (including anhydride and hydrates such as dihydrate); an oxalic acid salt such as sodium oxalate, sodium hydrogen oxalate, ammonium oxalate, or ammonium hydrogen oxalate; carbonic acid; or a carbonic acid salt such as sodium carbonate, sodium hydrogen carbonate, ammonium carbonate, or ammonium hydrogen carbonate. The zinc ion-aggregating agent is more preferably oxalic acid or a salt thereof, and particularly preferably oxalic acid.

The amount of the zinc ion-aggregating agent mixed with the nitric acid active treatment solution is preferably 0.2 to 2 times and more preferably 0.5 to 1.0 times the theoretical amount for the zinc ions. For example, when the aggregating agent is oxalic acid, the theoretical amount of the aggregating agent for zinc is 1 mol per mole of zinc. Accordingly, 0.2 to 2 times the theoretical amount for zinc means 0.2 to 2 mol of the aggregating agent per mole of zinc.

Methods for mixing the nitric acid active treatment solution with the aggregating agent include a method in which while the nitric acid solution is being stirred, the aggregating agent is added to the nitric acid solution, as well as a method in which while the aggregating agent in the form of an aqueous solution or a slurry is being stirred, the nitric acid solution is added to the aggregating agent. Any of these methods may be employed.

The time for which the nitric acid active treatment solution and the aggregating agent are mixed is preferably 5 minutes to 24 hours, and is particularly preferably 10 minutes to 12 hours. Within this range, the amount of impurities contaminating the aggregating agent-zinc can be reduced, so that the aggregates are sufficiently formed, and the amount of zinc recovered is improved. Note that when the mixing was conducted for more than 24 hours, the formation of the aggregation does not change, and hence the economic efficiency deteriorates.

The liquid temperature at the mixing of the nitric acid active treatment solution with the aggregating agent is preferably in a range from 0 to 90° C. However, mixing at normal temperature without controlling the temperature is preferable in terms of the energy costs.

As described above, the activation nitric acid solution and the aggregating agent are mixed with each other to form a deposit. Then, the deposit is subjected to solid-liquid separation by filtration or the like. A filtrate from which the deposit is removed is reused as the nitric acid active treatment solution. Here, when the pH of the above-described nitric acid active treatment solution is below an ordinary pH range, the pH is adjusted within the range by diluting the solution with water or adding sodium hydroxide or the like. When the pH is above the range, it is preferable to adjust the pH within the range by adding nitric acid.

The recovered deposit (the salt of the aggregating agent with zinc) is preferably washed in a washing step in order to recover the zinc at a higher purity. Here, it is preferable to use water or an aqueous aggregating agent solution as the washing liquid. Water includes pure water and ultra pure water. Meanwhile, the aqueous aggregating agent solution is preferably an aqueous aggregating agent solution of a concentration of 0.5 mol/l or less.

Note that, when the salt of the aggregating agent with zinc is recovered immediately after the addition of the aggregating agent without the washing, or when the washing is conducted by a method other than washing by filtration, the salt of the aggregating agent with zinc is to be subjected to solid-liquid separation. Here, this solid-liquid separation can be achieved by ordinary filtration.

The aggregates (the salt of the aggregating agent with zinc) subjected to the solid-liquid separation can be converted to zinc oxide by calcination. The calcination is preferably conducted by heating the deposit directly after the solid-liquid separation. It is also possible to dry the aggregates after the solid-liquid separation and then calcine the aggregates. However, the direct calcination is more preferable from the viewpoints of energy costs, efficiency, and the like. The calcination temperature is preferably 300 to 800° C., and more preferably 400 to 700° C.

In the present invention, it is also preferable to regenerate a nitric acid active treatment solution as follows. Specifically, zinc ions which come to be mixed in a nitric acid activation treatment tank (1) are introduced in the form of a zinc ion-containing nitric acid active treatment solution into an aggregation tank (2). Then, a zinc ion-aggregating agent, for example, oxalic acid or a salt thereof and/or carbonic acid or a salt thereof are added to the aggregation tank (2), and mixed with the zinc ion-containing nitric acid active treatment solution, to thereby aggregate the zinc ions as an insoluble salt, for example, zinc oxalate and/or zinc carbonate, and the insoluble salt is removed. The obtained liquid from which the zinc ions are removed is transferred to and stored in the recovered liquid storage tank (3). Subsequently, the pH of the nitric acid active treatment solution is adjusted in the tank (3), and then nitric acid active treatment solution is returned to the nitric acid activation treatment tank (1).

In the present invention, it is more preferable to use a regeneration treatment apparatus for a nitric acid active treatment solution for a surface of a zinc-based material plated metal member, the apparatus comprising: a nitric acid activation treatment tank (1) in which an active treatment is conducted on a surface of a zinc-based material plated metal member by using a nitric acid active treatment solution; an aggregation tank (2) in which a zinc ion-aggregating agent is added to the nitric acid active treatment solution to thereby aggregate the zinc ions in the solution as an insoluble salt; a filter apparatus (4) configured to separate and remove the aggregated insoluble zinc salt; and a recovered-liquid storage tank (3) in which a filtrate is temporarily stored, wherein the nitric acid activation treatment tank (1), the aggregation tank (2), the filter apparatus (4), and the recovered-liquid storage tank (3) are provided consecutively in this order through piping to form a circulating circuit, and at least one or more of the recovered-liquid storage tank (3), the nitric acid activation treatment tank (1), and the piping between the recovered-liquid storage tank (3) and the activation treatment tank (1) provided consecutively further have a pH-controlling device (5) configured to maintain the pH due to the nitric acid concentration of the nitric acid active treatment solution within a specific range.

In this apparatus, the nitric acid activation treatment on the plated substrate is conducted in the nitric acid active treatment solution tank (1). The pH increased by the treatment is preferably adjusted to a designated pH by transferring the nitric acid active treatment solution, from which zinc is removed, stored in the recovered-liquid storage tank (3) to the nitric acid active treatment solution treatment tank (1) with a liquid transfer pump. Here, the pH is preferably controlled by using a pH sensor. An excessive amount of the nitric acid active treatment solution, which results from the transfer of the nitric acid active treatment solution from which zinc is removed to the nitric acid active treatment solution treatment tank (1), is preferably transferred to and accumulated in the aggregation tank (2).

Preferably, after a specified amount of the nitric acid active treatment solution is accumulated in the aggregation tank (2), the concentration of the zinc ions in the solution is measured, and the zinc ion-aggregating agent in the theoretical amount for the zinc concentration ion concentration is added to the aggregation tank (2) followed by mixing, and the insoluble salt is aggregated and settled. After that, the nitric acid active treatment solution in the aggregation tank (2) is filtered through a filter, and transferred to the recovered-liquid storage tank (3). Then, the insoluble salt accumulated in the aggregation tank (2) is recovered and removed.

As described above, the zinc ions which come to be mixed in the nitric acid active treatment solution is removed by adding the zinc ion-aggregating agent followed by mixing, settling the zinc ions as an insoluble salt, and recovering the deposit. This step is conducted in the aggregation tank (2). By conducting this step in the tank other than the nitric acid active treatment solution treatment tank (1), a deposit can be prevented from adhering to the plated substrate, when the activation treatment is conducted in the nitric acid active treatment solution treatment tank (1). In addition, the nitric acid active treatment solution from which the zinc ions are removed can be returned to the nitric acid active treatment solution treatment tank (1) also during the step in which the liquid from which zinc is removed is transferred to and stored in the recovered-liquid storage tank (3), and the zinc ion-aggregating agent is added to the recovered-liquid storage tank (3) followed by mixing, to settle the zinc ions as an insoluble salt.

Furthermore, the above-described apparatus is preferably such that the nitric acid activation treatment tank (1) has the pH-controlling device (5), and a control of the pH due to the nitric acid concentration of the nitric acid active treatment solution in the nitric acid activation treatment tank (1) is conducted based on the amount of the recovered liquid transferred from the recovered-liquid storage tank (3).

In addition, the pH-controlling device (5) preferably comprises a pH sensor, a liquid transfer pump, and a liquid transfer amount controlling device.

The apparatus is preferably such that the pH of the nitric acid active treatment solution is controlled within a specific value range in the nitric acid activation treatment tank (1), and when the concentration of the zinc ions increases because of the active treatment, and consequently the pH deviates from the specific value range, the pH of the nitric acid active treatment solution in the treatment tank is retained in the specific value range by transferring the nitric acid active treatment solution in the treatment tank to the aggregation tank (2), and transferring the recovered treatment solution from the recovered-liquid storage tank (3).

The above-described apparatus is preferably such that, in the aggregation tank (2), the zinc ion-aggregating agent is added to, mixed with, and stirred with the nitric acid active treatment solution which is transferred from the nitric acid activation treatment tank (1) and which has a zinc ion concentration at or above a specific value, to thereby aggregate the zinc ions as the insoluble salt, then the obtained suspension is transferred to the filter apparatus, and a filtrate from which the zinc ions are removed as the insoluble salt is transferred as a recovered treatment solution to the recovered-liquid storage tank (3).

The above-described apparatus is preferably such that the recovered treatment solution is temporarily stored in the recovered-liquid storage tank (3), the pH of the recovered treatment solution is controlled within the same specific value range as that of the nitric acid active treatment liquid in the activation treatment tank (1) by adding nitric acid or an aqueous alkali solution, on an as-needed basis, and the recovered treatment solution is transferred as a regenerated active treatment liquid to the nitric acid activation treatment tank (1), on an as-needed basis.

Next, the present invention is described further specifically based on Examples.

EXAMPLES

Examples 1 to 10

Two nitric acid active treatment solutions A and B shown in Table 1 were prepared, and zinc was recovered and removed from those treatment solutions to test the activation performance of regenerated liquids.

TABLE 1

|  |  | A | B |
|---|---|---|---|
| pH |  | 1.3 | 1.2 |
| Total-$HNO_3$ | g/L | 60.1 | 49.5 |
| Zn | g/L | 20.0 | 22.1 |
| Fe | mg/L | 0 | 18.7 |

The zinc ions in the above-described nitric acid active treatment solutions (A and B) were removed under various conditions, and the performance of regenerated liquids were evaluated. Specifically, the aggregating agents shown in Table 2 were added and dissolved with stirring for 30 seconds. Then, the mixtures were allowed to stand for their corresponding times, and then filtered by using a No. 5C filter paper. The concentration of zinc ions in each filtrate was measured. Further, in each of the nitric acid active treatment solutions whose pHs of the filtrates were adjusted to the values before the addition of the aggregating agents by using sodium hydroxide and nitric acid, M6 bolts (material: iron) subjected to zincate-zinc plating (NZ-750 manufactured by DIPSOL CHEMICALS Co., Ltd.) with a thickness of 8 μm were immersed at 25° C. for 20 seconds. Thus, the activation performance of the nitric acid active treatment solution was tested. Note that the evaluation of the activation performance was conducted by visually checking whether or not the plated substrates after the activation treatment were cloudy (hereinafter, the same).

In addition, as Comparative Examples, in a case (Comparative Example 1) of a newly prepared bath of a nitric acid active treatment solution, a case (Comparative Example 2) of using the solution A shown in Table 1 above, and a case (Comparative Example 3) of using the solution B shown in Table 1 above, which were not subjected to the treatment using any zinc ion-aggregating agent, M6 bolts (material: iron) subjected to zincate-zinc plating (NZ-750 manufactured by DIPSOL CHEMICALS Co., Ltd.) with a thickness of 8 μm were immersed in each of these liquids at 25° C. for 20 seconds, and thus the activation performance was tested.

TABLE 3

|  |  | Comparative Example | | |
|---|---|---|---|---|
|  |  | 1 | 2 | 3 |
| pH |  | 1.6 | 1.3 | 1.2 |
| Total-$HNO_3$ | g/L | 2.5 | 60.1 | 49.5 |
| Zn | g/L | 0 | 20.0 | 22.1 |
| Fe | mg/L | 0 | 0 | 18.7 |

Table 4 collectively shows the results of Examples 1 to 10, i.e., the zinc removal ratio and the activation performance of the regenerated liquids. Table 5 collectively shows the results of Comparative Examples 1 to 3, i.e., the activation performance of the regenerated liquids.

TABLE 4

| Example |  | 1 | 2 | 3 | 4 | 5 | 6 | 7 | 8 | 9 | 10 |
|---|---|---|---|---|---|---|---|---|---|---|---|
| Amount of zinc remaining in filtrate | g/L | 12.4 | 11.4 | 11.4 | 3.9 | 2 | 1.9 | 7.2 | 5.6 | 2.5 | 2.3 |
| Activation performance of regenerated liquid |  | Slightly cloudy | Not cloudy | Not cloudy | Not cloudy | Not cloudy | Not cloudy | Not cloudy | Not cloudy | Not cloudy | Not cloudy |

TABLE 5

|  | Comparative Example | | |
|---|---|---|---|
|  | 1 | 2 | 3 |
| Activation performance | Not cloudy | Cloudy | Cloudy |

The above-described results showed that the plated substrate in Comparative Example 1 in which the newly prepared bath was used was not cloudy and was glossy after the activation treatment, whereas the plated material in each of Comparative Examples 2 and 3 in which zinc was accumulated became cloudy, and was not glossy after the activation treatment. In contrast, in each of the cases where the activation was conducted by using the regenerated liquids of Examples 1 to 10, the plated substrate was not cloudy, and a glossy appearance was obtained after the activation treatment. From

TABLE 2

| Example |  | 1 | 2 | 3 | 4 | 5 | 6 | 7 | 8 | 9 | 10 |
|---|---|---|---|---|---|---|---|---|---|---|---|
| Nitric acid active treatment solution (see Table 1) |  | A | A | A | A | A | A | A | A | B | B |
| Oxalic acid dihydrate | g/L | 19.2 | 19.2 | 19.2 | 38.4 | 38.4 | 38.4 | — | — | 42.4 | 42.4 |
| Sodium hydrogen carbonate | g/L | — | — | — | — | — | — | 25.6 | 25.6 | — | — |
| Standing time | Minute | 5 | 30 | 60 | 5 | 30 | 60 | 30 | 60 | 30 | 60 | these results, it has been found that the present invention in which zinc is removed in the form of a salt of zinc with a zinc ion-aggregating agent by adding the aggregating agent makes it possible to achieve efficient regeneration as a nitric acid active treatment solution.

Example 11

Figure 21:
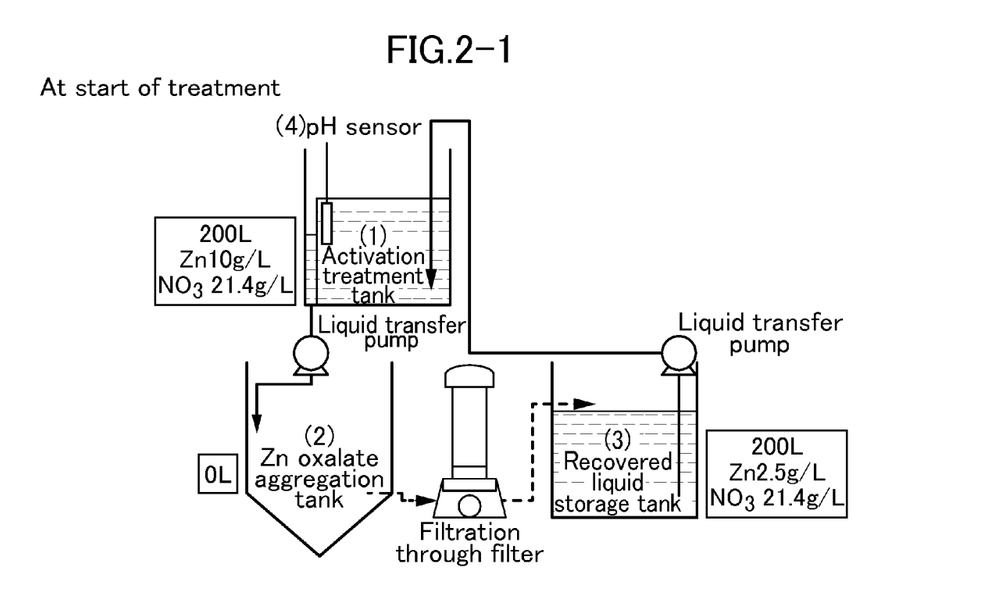
Figure 22:
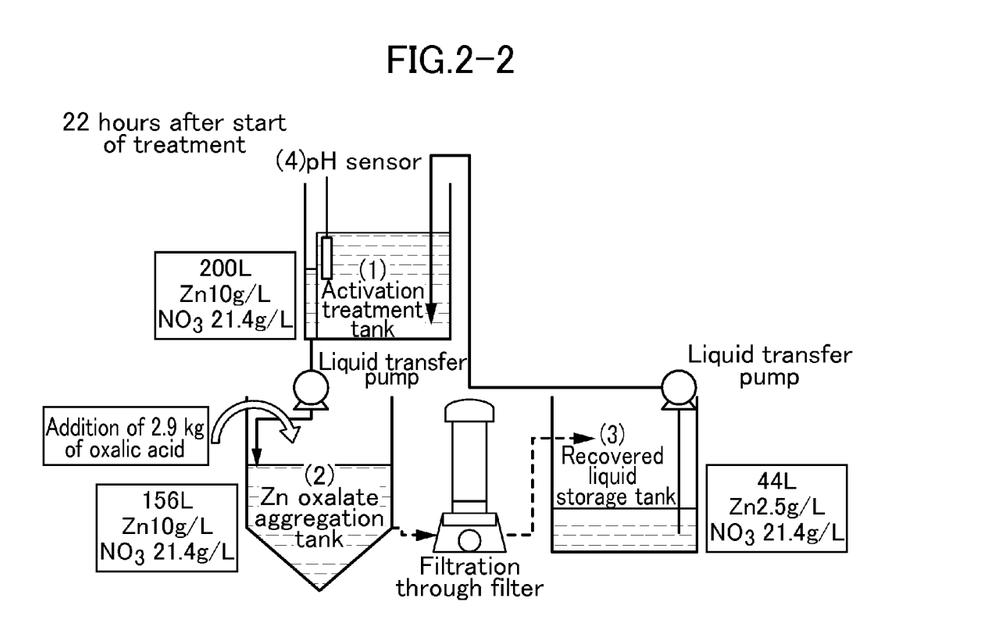
Figure 23:
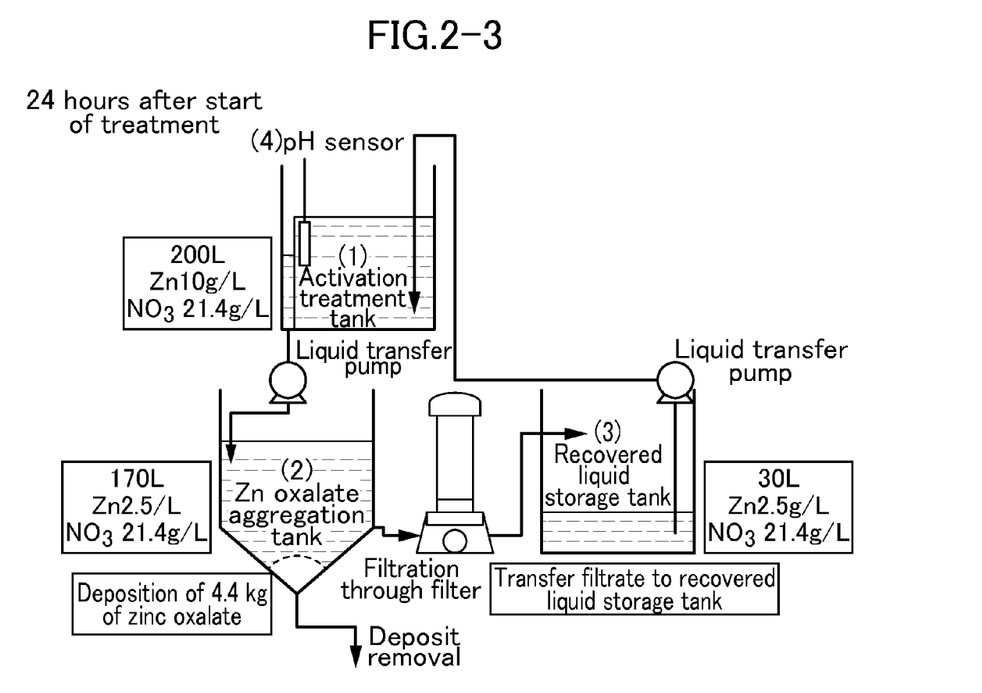

The method for regenerating a nitric acid active treatment solution of the present invention using the regeneration treatment apparatus for a nitric acid active treatment solution for a surface of a zinc-based material plated metal member shown in FIGS. 2-1 to 2-3 is shown. Specifically, Tables 6 to 8 show operation conditions at the start of the treatment (see FIG. 2-1), 22 hours after the start (see FIGS. 2-2), and 24 hours after the start (see FIG. 2-3), respectively.

TABLE 6

| At start of treatment | Unit | Activation treatment tank | Zn oxalate aggregation tank | Recovered-liquid storage tank |
|---|---|---|---|---|
| Amount of nitric acid solution | L | 200 | 0 | 200 |
| Zinc concentration | g/L | 10 | — | 2.5 |
| Total nitric acid concentration | g/L | 21.4 | — | 21.4 |
| Effective nitric acid concentration | g/L | 2.5 | — | 16.7 |

TABLE 7

| 22 hours after start | Unit | Activation treatment tank | Zn oxalate aggregation tank | Recovered-liquid storage tank |
|---|---|---|---|---|
| Amount of nitric acid solution | L | 200 | 156 | 44 |
| Zinc concentration | g/L | 10 | 10 | 2.5 |
| Total nitric acid concentration | g/L | 21.4 | 21.4 | 21.4 |
| Effective nitric acid concentration | g/L | 2.5 | 2.5 | 16.7 |

TABLE 8

| 24 hours after start | Unit | Activation treatment tank | Zn oxalate aggregation tank | Recovered-liquid storage tank |
|---|---|---|---|---|
| Amount of nitric acid solution | L | 200 | 170 | 30 |
| Zinc concentration | g/L | 10 | 2.5 | 2.5 |
| Total nitric acid concentration | g/L | 21.4 | 21.4 | 21.4 |
| Effective nitric acid concentration | g/L | 2.5 | 16.7 | 16.7 |

The regeneration treatment apparatus for a nitric acid active treatment solution for a surface of a zinc-based material plated metal member used in Example 11 was a plating apparatus operated continuously 24 hours a day, and the amount of zinc accumulated in the nitric acid solution due to the activation treatment on the plated substrates is 62.5 g on average. In addition, the step of depositing and removing zinc with oxalic acid was conducted once a day. The dihydrate was used as the oxalic acid mixed. In addition, since the obtained gloss on the surface of each substrate after the activation treatment was sufficient even in a case where the zinc concentration in the activation nitric acid solution was 10 g/L, the zinc concentration in the activation treatment tank (1) was maintained at 10 g/L.

Table 6 shows the states of the nitric acid active treatment solution treatment tank (activation treatment tank) (1), the aggregation tank (2), and the recovered-liquid storage tank (3) at the start of the operation of the activation treatment. As described above, when the activation treatment was conducted on a plated substrate in the activation treatment tank, and zinc ions were dissolved and accumulated in the nitric acid active treatment solution to increase the pH, the liquid, form which zinc is removed, stored in the recovered-liquid storage tank is transferred to the nitric acid active treatment solution treatment tank (1) with a liquid transfer pump, and the pH is adjusted to a designated pH. An average liquid flow at which the nitric acid solution was transferred was 7.1 L/h. In addition, the excessive amount of the nitric acid solution, which resulted from the transfer of the liquid, form which zinc was removed, to the nitric acid active treatment solution treatment tank (1), was transferred to and accumulated in the aggregation layer (2). As a result, the zinc concentration in the nitric acid solution in the nitric acid active treatment solution treatment tank (1) was maintained at 10 g/L.

Table 7 shows the states of the activation treatment tank (1), the aggregation tank (2), and the recovered-liquid storage tank (3), after 22 hours had elapsed from the start of the operation of the activation treatment. In the aggregation tank, 156 L of the nitric acid solution transferred from the activation treatment tank was accumulated, and the nitric acid solution in the recovered-liquid storage tank decreased to 44 L. In this state, zinc oxalate was aggregated by adding oxalic acid to the aggregation tank followed by mixing. Since the amount of zinc dissolved per day was 1500 g, the amount of oxalic acid mixed was 2890 g, which was the theoretical amount of oxalic acid for this amount of zinc. After that, zinc oxalate was sufficiently aggregated and deposited over 2 hours.

Table 8 shows the states of the activation treatment tank (1), the aggregation tank (2), and the recovered-liquid storage tank (3), after 2 hours had elapsed from the addition of oxalic acid to the aggregation tank (2), i.e., 24 hours had elapsed from the start of the operation of the activation treatment. Zinc was removed from the nitric acid solution in the aggregation tank, and this nitric acid solution has the same concentration as the nitric acid solution in the recovered-liquid storage tank. In this state, the liquid, form which zinc was removed, was transferred from the aggregation tank to the recovered-liquid storage tank, while the suspend zinc oxalate was being removed by filtration through a filter. After that, the zinc nitrate accumulated in the aggregation tank (2) is recovered and removed, and a separate step for reusing the zinc nitrate was conducted. The nitric acid solution was supplied to the recovered-liquid storage tank by the amount lost by this recovery and removal of the deposit, and the states were returned to those in Table 6.

The use of the regeneration treatment apparatus as described above achieves industrially excellent effects such as the simplification of the steps, the control of the quality of trivalent chromium chemical conversion treatment at a constant level at low costs, and reduction of waste nitric acid as much as possible.

What is claimed is:
1. A method for regenerating a nitric acid active treatment solution, comprising:
adding a zinc ion-aggregating agent to a nitric acid active treatment solution for a surface of a zinc-based material plated metal member, the nitric acid active treatment solution containing zinc ions, to thereby aggregate the zinc ions in the solution as an insoluble salt; and separating and removing the insoluble salt.

2. The method for regenerating a nitric acid active treatment solution according to claim 1, wherein
the zinc ion-aggregating agent is oxalic acid or a salt thereof and/or a carbonic acid or a salt thereof.

3. The method for regenerating a nitric acid active treatment solution according to claim 2, wherein
the amount of the zinc ion-aggregating agent added relative to the concentration of the zinc ions in the nitric acid active treatment solution is in a range from 0.5 to 1 times in terms of moles, when the zinc ion-aggregating agent is oxalic acid or a salt thereof, in a range from 0.5 to 2 times in terms of moles, when the zinc ion-aggregating agent is carbonic acid or a salt thereof, or in a range from 0.5 to 2 times in terms of moles, when the zinc ion-aggregating agent is a mixture of the both.

4. The method for regenerating a nitric acid active treatment solution according to claim 1, wherein
the zinc ion-aggregating agent is added to and mixed with the nitric acid active treatment solution at a temperature in a range from 0 to 90° C.,
the mixture is stirred at the same temperature for further 5 minutes to 24 hours to thereby aggregate the zinc ions as the insoluble salt, and then
the insoluble salt is separated and removed.

5. The method for regenerating a nitric acid active treatment solution according to claim 1, wherein
the pH of the nitric acid active treatment solution is in a range from 0.5 to 3.0, and
a recovered nitric acid active solution, which is a filtrate from which the insoluble salt is separated and removed, is regenerated as the nitric acid active solution by adjusting the pH of the recovered nitric acid active solution in a range from 0.5 to 3.0.

6. A method for regenerating a nitric acid active treatment solution, comprising:
introducing zinc ions, which come to be mixed in a nitric acid activation treatment tank (1), in the form of a zinc ion-containing nitric acid active treatment solution into an aggregation tank (2);
adding a zinc ion-aggregating agent to the aggregation tank (2), mixing the zinc ion-aggregating agent with the zinc ion-containing nitric acid active treatment solution to thereby aggregate the zinc ions as an insoluble salt, and removing the insoluble salt;
transferring the obtained liquid from which the zinc ions are removed to a recovered-liquid storage tank (3) and storing the liquid in the recovered-liquid storage tank (3), then
adjusting the pH of the nitric acid active treatment solution in the tank (3), and then
returning the nitric acid active treatment solution to the nitric acid activation treatment tank (1).

7. A regeneration treatment apparatus for a nitric acid active treatment solution for a surface of a zinc-based material plated metal member, comprising:
a nitric acid activation treatment tank (1) in which an active treatment is conducted on a surface of a zinc-based material plated metal member by using a nitric acid active treatment solution;
an aggregation tank (2) in which a zinc ion-aggregating agent is added to the nitric acid active treatment solution to thereby aggregate the zinc ions in the solution as an insoluble salt;
a filter apparatus (4) configured to separate and remove the aggregated insoluble zinc salt; and
a recovered-liquid storage tank (3) in which a filtrate is temporarily stored, wherein
the nitric acid activation treatment tank (1), the aggregation tank (2), the filter apparatus (4), and the recovered-liquid storage tank (3) are provided consecutively in this order through piping to form a circulating circuit, and
at least one or more of the recovered-liquid storage tank (3), the nitric acid activation treatment tank (1), and the piping between the recovered-liquid storage tank (3) and the activation treatment tank (1) provided consecutively further have a pH-controlling device (5) configured to maintain the pH due to the nitric acid concentration of the nitric acid active treatment solution within a specific range.

8. The regeneration treatment apparatus according to claim 7, wherein
the nitric acid activation treatment tank (1) has the pH-controlling device (5), and
a control of the pH due to the nitric acid concentration of the nitric acid active treatment solution in the nitric acid activation treatment tank (1) is conducted based on the amount of the recovered liquid transferred from the recovered-liquid storage tank (3).

9. The regeneration treatment apparatus according to claim 7, wherein
the pH-controlling device (5) comprises a pH sensor, a liquid transfer pump, and a liquid transfer amount controlling device.

10. The regeneration treatment apparatus according to claim 7, wherein
the pH of the nitric acid active treatment solution is controlled within a specific value range in the nitric acid activation treatment tank (1), and
when the concentration of the zinc ions increases because of the active treatment, and the pH consequently deviates from the specific value range, the pH of the nitric acid active treatment solution in the treatment tank is retained in the specific value range by transferring the nitric acid active treatment solution in the treatment tank to the aggregation tank (2), and transferring the recovered treatment solution from the recovered-liquid storage tank (3).

11. The regeneration treatment apparatus according to claim 7, wherein
in the aggregation tank (2), the zinc ion-aggregating agent is added to, mixed with, and stirred with the nitric acid active treatment solution which is transferred from the nitric acid activation treatment tank (1) and which has a zinc ion concentration at or above a specific value, to thereby aggregate the zinc ions as the insoluble salt, then
the obtained suspension is transferred to the filter apparatus, and
a filtrate from which the zinc ions are removed as the insoluble salt is transferred as a recovered treatment solution to the recovered-liquid storage tank (3).

12. The regeneration treatment apparatus according to claim 7, wherein
the recovered treatment solution is temporarily stored in the recovered-liquid storage tank (3),
the pH of the recovered treatment solution is controlled within the same specific value range as that of the nitric acid active treatment liquid in the activation treatment tank (1), on an as-needed basis, and the recovered treatment solution is transferred as a regenerated active treatment liquid to the nitric acid activation treatment tank (1), on an as-needed basis.

\* \* \* \* \*